United States Patent
Mammen et al.

(10) Patent No.: US 11,778,043 B2
(45) Date of Patent: Oct. 3, 2023

(54) HORIZONTAL SCALING FOR A SOFTWARE DEFINED WIDE AREA NETWORK (SD-WAN)

(71) Applicant: Cisco Technology, Inc., San Jose, CA (US)

(72) Inventors: Biju Mathews Mammen, Mountain House, CA (US); Kiran Desai, Santa Clara, CA (US); Jun Shang, Tokyo (JP); Venkata Suresh Kalluri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/069,046

(22) Filed: Dec. 20, 2022

(65) Prior Publication Data
US 2023/0119414 A1    Apr. 20, 2023

Related U.S. Application Data

(62) Division of application No. 17/389,008, filed on Jul. 29, 2021, now Pat. No. 11,546,432.
(Continued)

(51) Int. Cl.
| | |
|---|---|
| *H04L 67/141* | (2022.01) |
| *H04L 41/12* | (2022.01) |
| *H04L 61/251* | (2022.01) |
| *H04L 9/40* | (2022.01) |
| *H04L 67/146* | (2022.01) |

(52) U.S. Cl.
CPC ............ *H04L 67/141* (2013.01); *H04L 41/12* (2013.01); *H04L 61/251* (2013.01); *H04L 63/166* (2013.01); *H04L 67/146* (2013.01)

(58) Field of Classification Search
None
See application file for complete search history.

(56) References Cited

U.S. PATENT DOCUMENTS

| | | |
|---|---|---|
| 2008/0075114 A1 | 3/2008 | Mo |
| 2013/0232278 A1 | 9/2013 | Zou et al. |
| | (Continued) | |

FOREIGN PATENT DOCUMENTS

| | | |
|---|---|---|
| WO | 2020081947 | 4/2020 |

*Primary Examiner* — Tonia L Dollinger
*Assistant Examiner* — Ishrat Rashid
(74) *Attorney, Agent, or Firm* — Polsinelli

(57) ABSTRACT

Disclosed are systems, apparatuses, methods, and computer-readable media for managing networks. According to at least one example, a method is provided for connecting to a network controller across different regions. The method includes identifying a first connection with a network orchestrator during establishment of a second connection with the network orchestrator from a network controller; establishing a sibling session that links the second connection and the first connection at a control plane; inserting a sibling data message that identifies the sibling session into control messages sent; receiving a message from the network orchestrator over the second connection, the message including an address of the network controller associated with the second connection; and transmitting the second address of the network controller over the first connection to the network orchestrator.

20 Claims, 12 Drawing Sheets

Related U.S. Application Data

(60) Provisional application No. 63/172,491, filed on Apr. 8, 2021.

(56) References Cited

U.S. PATENT DOCUMENTS

| | | | |
|---|---|---|---|
| 2015/0244560 A1* | 8/2015 | Madem | H04L 69/14 |
| | | | 709/223 |
| 2018/0048527 A1* | 2/2018 | Ganjam | H04L 61/5007 |
| 2020/0067831 A1 | 2/2020 | Spraggins et al. | |
| 2021/0136871 A1 | 5/2021 | Bull et al. | |

\* cited by examiner

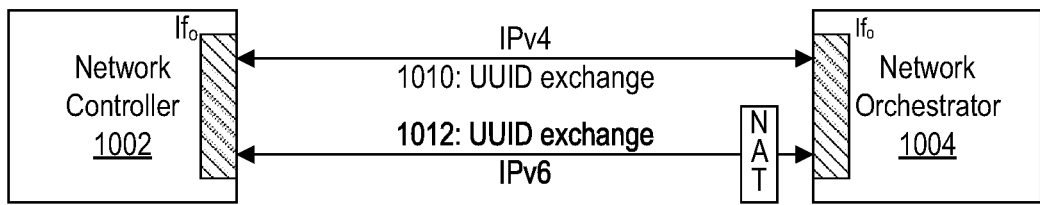
FIG. 10A
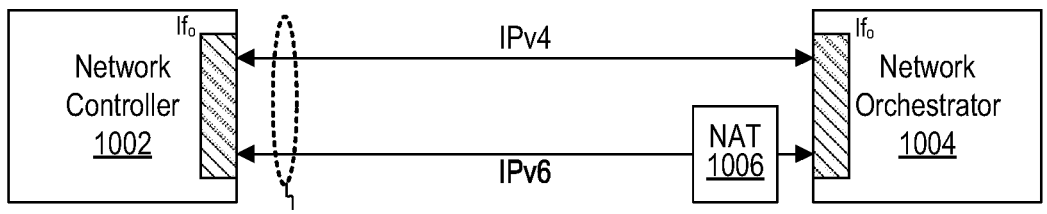
FIG. 10B
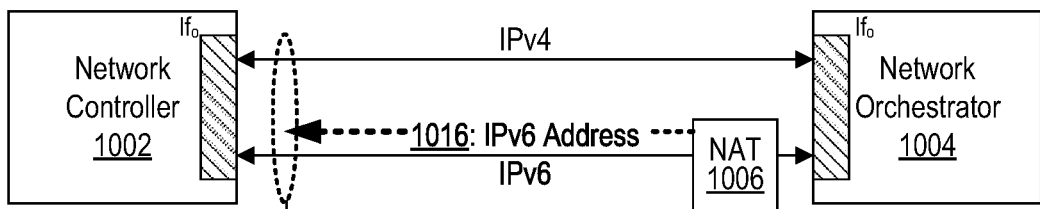
FIG. 10C
FIG. 10

HORIZONTAL SCALING FOR A SOFTWARE DEFINED WIDE AREA NETWORK (SD-WAN)

CROSS-REFERENCE TO RELATED APPLICATIONS

This application is a divisional of U.S. application Ser. No. 17/389,008, filed on Jul. 29, 2021, which in turn, claims priority to U.S. Provisional Patent Application No. 63/172,491, filed on Apr. 8, 2021, the content of which are incorporated herein by reference in their entirety.

TECHNICAL FIELD

The present disclosure relates generally to computer networks, and, more particularly, to horizontal scaling for a software defined wide area network (SD-WAN).

DESCRIPTION OF THE RELATED TECHNOLOGY

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

BRIEF DESCRIPTION OF THE DRAWINGS

FIGS. 10A-F illustrate various block diagrams illustrating communications of the network in accordance with an embodiment.

DETAILED DESCRIPTION

Figure 1:
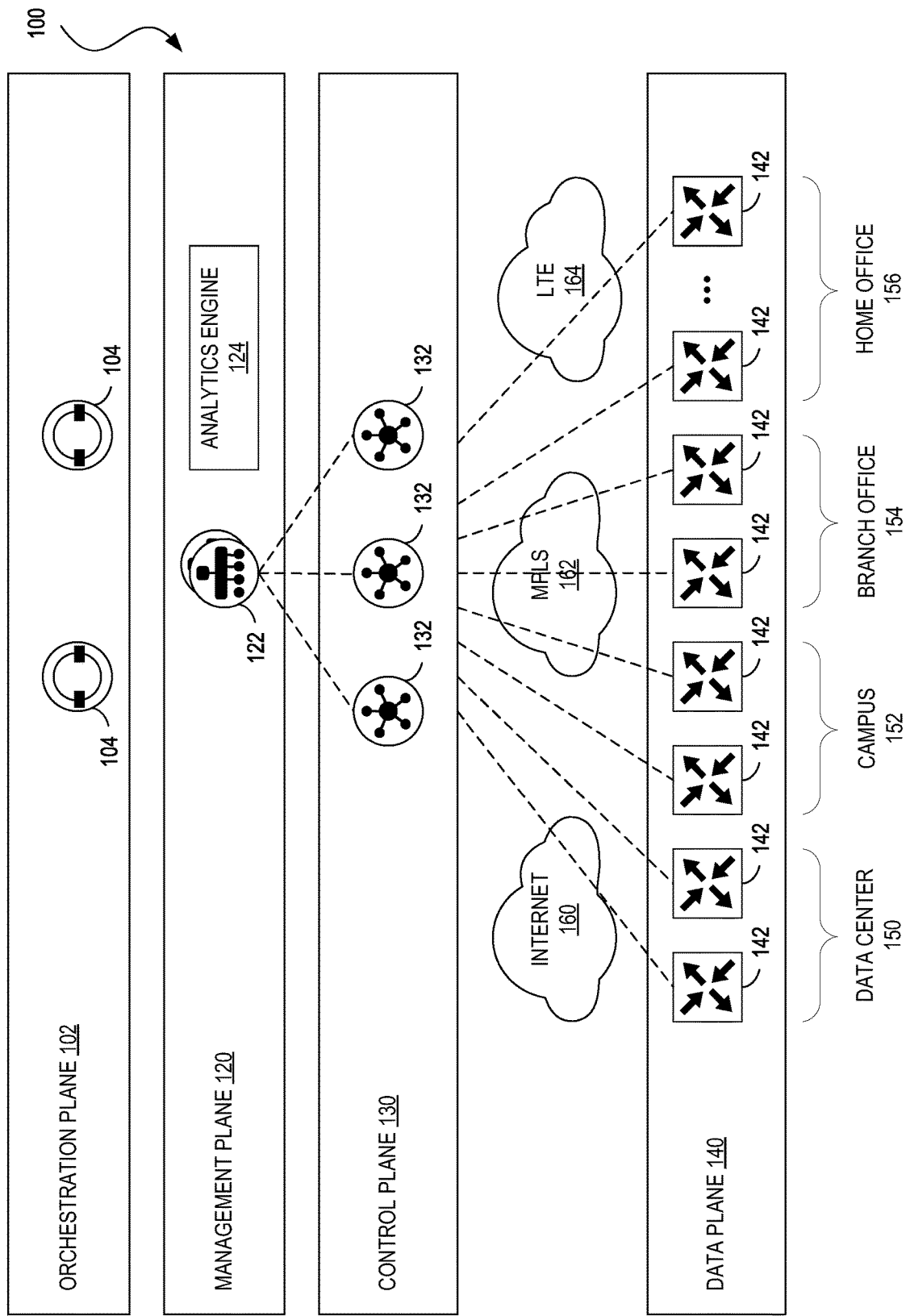
FIG. 1 illustrates an example of a high-level network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A method for horizontally scaling a network configuration is described in detail below. Entities may exist across different geographical regions, countries, and even continents. In some cases, business entities may want to centralize control plane aspects of their network. Accordingly, methods, systems, and techniques for horizontally a scaling software defined wide area network (SD-WAN) are described below. In some examples, IP addresses of a network controller appliances from a central location are provided over a single network connection to network edge devices in different regions.

Systems, methods, and computer-readable media are provided for scaling a network across different regions or domains. According to at least one example, a method is provided for scaling a network. The method includes: identifying a first connection with a network orchestrator during establishment of a second connection with the network orchestrator from a network controller; establishing a sibling session that links the second connection and the first connection at a control plane; inserting a sibling data message that identifies the sibling session into control messages sent; receiving a message from the network orchestrator over the second connection, the message including an address of the network controller associated with the second connection; and transmitting the second address of the network controller over the first connection to the network orchestrator. The network orchestrator receives the second address of the network controller and associates the first connection and the second connection as a single logical connection. The network orchestrator is configured to transmit the first address and the second address during setup of network edge devices.

In another example, an apparatus for scaling a network across different regions or domains is provided that includes a memory (e.g., configured to store data, such as virtual content data, one or more images, etc.) and one or more processors (e.g., implemented in circuitry) coupled to the memory. The one or more processors are configured to and can: identify a first connection with a network orchestrator during establishment of a second connection with the network orchestrator from a network controller; establish a sibling session that links the second connection and the first connection at a control plane; insert a sibling data message that identifies the sibling session into control messages sent; receive a message from the network orchestrator over the second connection, the message including an address of the network controller associated with the second connection; and transmit the second address of the network controller over the first connection to the network orchestrator. The network orchestrator receives the second address of the network controller and associates the first connection and the second connection as a single logical connection. The network orchestrator is configured to transmit the first address and the second address during setup of network edge devices.

In another example, a non-transitory computer-readable medium is provided that has stored thereon instructions that, when executed by one or more processors, cause the one or more processors to: identify a first connection with a network orchestrator during establishment of a second connection with the network orchestrator from a network controller; establish a sibling session that links the second connection and the first connection at a control plane; insert a sibling data message that identifies the sibling session into control messages sent; receive a message from the network orchestrator over the second connection, the message including an address of the network controller associated with the second connection; and transmit the second address of the network controller over the first connection to the network orchestrator. The network orchestrator receives the second address of the network controller and associates the first connection and the second connection as a single logical connection. The network orchestrator is configured to transmit the first address and the second address during setup of network edge devices.

In some examples, the sibling session is identified based on identifying a universal unique identifier (UUID) of the network orchestrator.

In some examples, the network orchestrator receives the sibling data message and associates the first connection and the second connection as a single logical connection.

In some examples, identification of the first connection occurs during a process challenge phase of a datagram transport layer security (DTLS) session initialization.

In some examples, the network orchestrator informs a network edge device of the second address of the network controller using a first connection.

In some examples, informing the network edge device of the second address of the network controller over the first connection precludes leakage of routes associated with network address translation.

In some examples, the network controller is located in a first region and the network orchestrator is located in a second region that is different from the first region.

In some examples, a network address translator converts IP addresses associated with the second region into IP addresses associated with the first region.

In some examples, the network controller is connected with a second network orchestrator is a different region.

In some examples, the first connection is an IPv4 connection and the second connection is an IPv6 connection, or the first connection is an IPv6 connection and the second connection is an IPv4 connection.

Disclosed are systems, apparatuses, methods, and computer-readable media for managing networks. According to at least one example, a method is provided for connecting to a network controller across different regions. The method includes: receiving a message including a sibling data message that indicates a first connection is related to a second connection, wherein the message is received when the first connection and the second connection are established with a network controller; transmitting a message to the network controller over the second connection, the message including a second address of the network controller associated with the second connection; receiving the address of the network controller associated with the second connection over the first connection from the network controller; linking the first connection and the second connection as a single logical connection; in response to receiving a request to connect a network edge device, transmitting a message to the network edge device over a first connection, the message identifying a first address of the network controller associated with the first connection and the second address.

In another example, an apparatus for connecting to a network controller across different regions is provided that includes a memory (e.g., configured to store data, such as virtual content data, one or more images, etc.) and one or more processors (e.g., implemented in circuitry) coupled to the memory. The one or more processors are configured to and can: receive a message including a sibling data message that indicates a first connection is related to a second connection, wherein the message is received when the first connection and the second connection are established with a network controller; transmit a message to the network controller over the second connection, the message including a second address of the network controller associated with the second connection; receive the address of the network controller associated with the second connection over the first connection from the network controller; link the first connection and the second connection as a single logical connection; in response to receiving a request to connect a network edge device, transmit a message to the network edge device over a first connection, the message identifying a first address of the network controller associated with the first connection and the second address.

In another example, a non-transitory computer-readable medium is provided that has stored thereon instructions that, when executed by one or more processors, cause the one or more processors to: receive a message including a sibling data message that indicates a first connection is related to a second connection, wherein the message is received when the first connection and the second connection are established with a network controller; transmit a message to the network controller over the second connection, the message including a second address of the network controller associated with the second connection; receive the address of the network controller associated with the second connection over the first connection from the network controller; link the first connection and the second connection as a single logical connection; in response to receiving a request to connect a network edge device, transmit a message to the network edge device over a first connection, the message identifying a first address of the network controller associated with the first connection and the second address.

In some examples, one or more of the methods, apparatuses, and computer-readable medium described above further comprise analyzing each connection of each network controller managed by a network orchestrator that is associated with a first type of address and analyzing each connection of each network controller that is associated with a second type of address and that is not linked to a connection associated with the first type of address.

Disclosed are systems, apparatuses, methods, and computer-readable media for managing networks. According to at least one example, a method is provided for controlling network edge devices in different regions. The method includes: a transceiver; a processor configured to execute instructions and cause the processor to: identifying a first connection with a network orchestrator during establishment of a second connection with the network orchestrator from the network controller, establishing a sibling session that links the second connection and the first connection at a control plane, inserting a sibling data message that identifies the sibling session into control messages, receiving a message from the network orchestrator over the second connection, the message including an address of the network controller associated with the second connection, transmitting the second address of the network controller over the first connection to the network orchestrator. The network orchestrator receives the second address of the network controller and associates the first connection and the second connection as a single logical connection. The network orchestrator is also configured to transmit the first address and the second address during setup of network edge devices.

In another example, an apparatus for controlling network edge devices in different regions is provided that includes a memory (e.g., configured to store data, such as virtual content data, one or more images, etc.) and one or more processors (e.g., implemented in circuitry) coupled to the memory. The one or more processors are configured to and can: a transceiver; a processor configured to execute instructions and cause the processor to: identify a first connection with a network orchestrator during establishment of a second connection with the network orchestrator from the network controller, establish a sibling session that links the second connection and the first connection at a control plane, insert a sibling data message that identifies the sibling session into control messages, receive a message from the network orchestrator over the second connection, the message including an address of the network controller associated with the second connection, transmit the second address of the network controller over the first connection to the network orchestrator. The network orchestrator receives the second address of the network controller and associates the first connection and the second connection as a single logical connection. The network orchestrator is also configured to transmit the first address and the second address during setup of network edge devices.

In another example, a non-transitory computer-readable medium is provided that has stored thereon instructions that, when executed by one or more processors, cause the one or more processors to: a transceiver; a processor configured to execute instructions and cause the processor to: identify a first connection with a network orchestrator during establishment of a second connection with the network orchestrator from the network controller, establish a sibling session that links the second connection and the first connection at a control plane, insert a sibling data message that identifies the sibling session into control messages, receive a message from the network orchestrator over the second connection, the message including an address of the network controller associated with the second connection, transmit the second address of the network controller over the first connection to the network orchestrator. The network orchestrator receives the second address of the network controller and associates the first connection and the second connection as a single logical connection. The network orchestrator is also configured to transmit the first address and the second address during setup of network edge devices.

In some examples, the sibling session is identified based on identifying a UUID of the network orchestrator.

In some examples, the network orchestrator receives the sibling data message and associates the first connection and the second connection as a single logical connection.

In some examples, identification of the first connection occurs during a process challenge phase of a DTLS session initialization.

In some examples, the network orchestrator informs a network edge device of the second address of the network controller using a first connection.

In some examples, informing the network edge device of the second address of the network controller over the first connection precludes leakage of routes associated with network address translation.

In some examples, the network controller is located in a first region and the network orchestrator is located in a second region that is different from the first region.

In some examples, a network address translator converts IP addresses associated with the second region into IP addresses associated with the first region.

Example Embodiments

As noted above, a business entity may want to horizontally scale a network across different geographical regions while centralizing of the management of the network. In some cases, this network may be associated with a different domain (e.g., different network providers) and each domain would have different internet protocol (IP) addresses. Existing management solutions for different domains exist and require additional devices to be present in each domain to implement control plane functions. This causes the business entity to add hardware and complexity to the management of their network. Moreover, an entity has a combination of IPv4 and IPv6 capable equipment, and the mixture of IP addressing adds additional configuration complexity, as well as security issues (e.g., route leakage). Network providers may require that customers do not leak any routes to prevent various malicious network attacks (e.g., man in the middle, etc.).

A method is disclosed in detail below for horizontally scaling a network across different domains. As described with reference to FIG. 6, a network controller appliance is configured to provide an IPv4 address and an IPv6 address (e.g., IPv4 connection or IPv6 connection) to network manager appliance at each domain or region, thereby allowing the network manager appliance or provide the IPv4 or IPv6 to the network edge devices that are managed by the single network connection. According, the network edge device can select and connect to the network controller appliance using a suitable interface from different domains or region. The business entity can thereby horizontally scale network locations across different domains and different geographical regions while providing a centralized control plane for managing devices of the network.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the edge network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
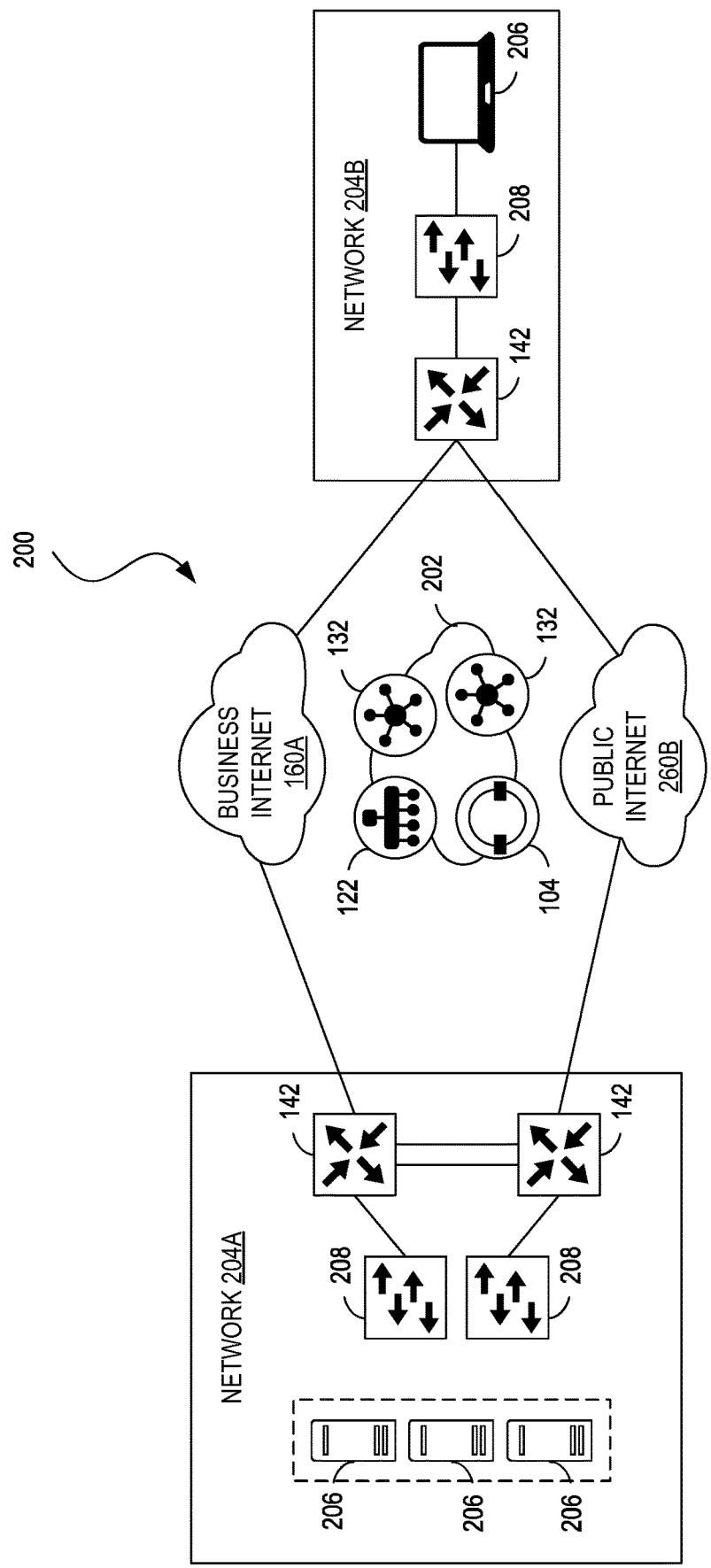
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
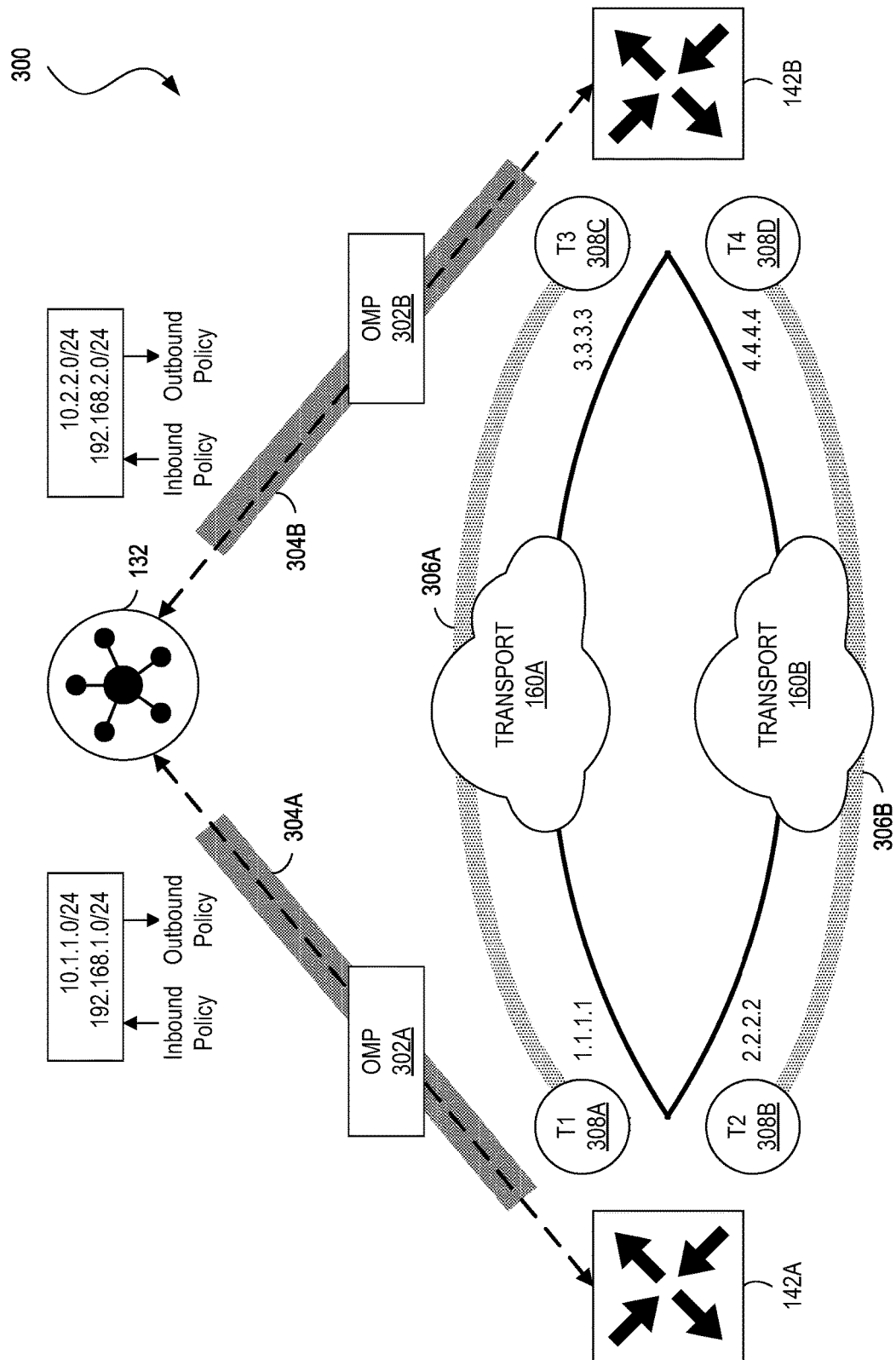
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:
  OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.
  TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.
  Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
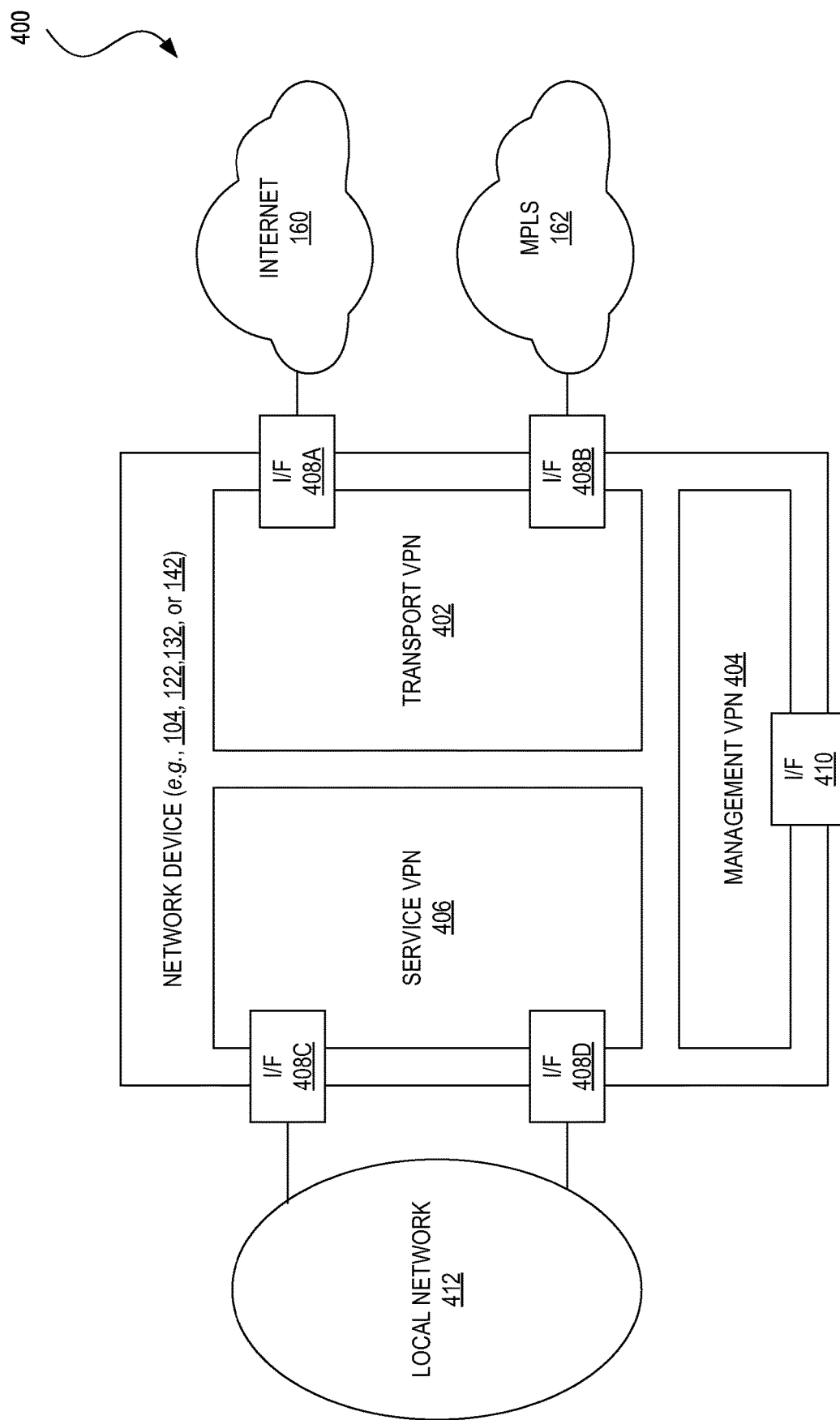
FIG. 4 illustrates an example of a diagram showing the operation of virtual private networks for segmenting a network in accordance with an embodiment.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
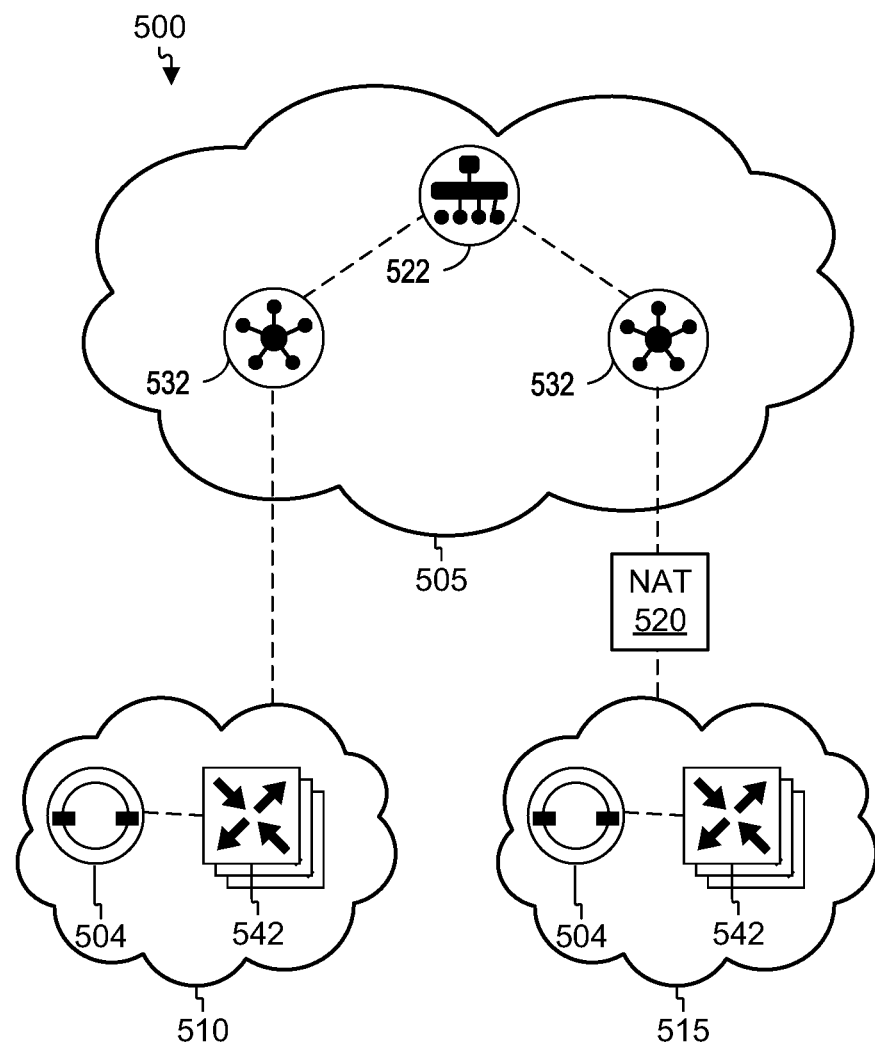
FIG. 5 illustrates a network configuration that implements a control plane across different domains in accordance with an embodiment.

FIG. 5 illustrates a network configuration that implements a control plane across different domains. In some instances, a network provider may want to horizontally scale network configurations across different geographical regions while centralizing of the management of the network. In this example, the network 500 includes a data center 505 that includes the management plane and the control plane functions. The data center 505 includes at least one network management appliance 522 that manages at least one network controller appliance 532.

The network 500 is geographically separated into a first region 510 and a second region 515, and either region can include the data center 505. For example, the first region 510 and second region 515 are distinct geographical regions and can also be distinct network operators having different domains. For example, a first network operator may operate and manage the first region 510 and a second, different network operator may operate and manage the second region 515. In any event, the data center 505 can be associated with either of the different regions and is illustrated separately for clarity.

In this example, the edge network devices 542 are managed by physical or virtual network orchestrator appliances 504 in each corresponding region. While management and controller functions can be incorporated into each different geographical regions, this would require additional devices (e.g., network controller appliance 532) to be incorporated into that region. To that end, the network operator may prefer to keep management plane and control plane functions at a single location, and then horizontally scale out additional network capacity in different regions without incurring the extra costs associated with additional network devices.

Each connection, which runs as a DTLS tunnel, is established after device authentication succeeds, and carries the encrypted payload between the network controller appliance 532 and the edge network device 542. This payload consists of route information necessary for the network controller appliance 532 to determine the network topology, and then to calculate the best routes to network destinations and distribute this route information to the edge network device 542. The DTLS connection between a network controller appliance 532 and the edge network device 542 is a static connection. The network controller appliance 532 has no direct peering relationships with any devices that the edge network device 542 is connected to on the service side.

This type of solution would require NAT to translate between addresses of one domain (e.g., first region 510) and another domain (e.g., second region 515). In this example, data center 505 is presumed to be disposed within the first region 510 and would therefore would not require NAT for the first domain. However, a NAT 520 is required to communicate between the first region 510, which includes data center 505, and the second region 515. The NAT 520 translates addresses within the second region into addresses associated with the first region to allow edge network devices 542 to communicate with the network controller appliance 532. While the NAT 520 illustrated in FIG. 5 is not specifically located in any region, the NAT 520 can be configured in the first region 510, the second region 515, or between the different regions.

The various network devices illustrated in FIG. 5 can be capable of IPv4 and/or IPv6 communication. A device that includes both IPv4 and IPv6 interfaces is referred to as a dual-stack configuration. However, a network controller appliance 532 may only be capable of serving a single interface (e.g., IPv4 or IPv6) of each client device. As a result, IPv4 or IPv6 routes can be leaked using the NAT 520. In some cases, a network operator may require that no routes are leaked to prevent malicious man-in-the-middle attacks and other security precautions. For example, there can be security and/or regional regulatory considerations that prevent routes from being leaked. To that end, this solution in FIG. 5 requires additional configuration to prevent IPv4 or IPv6 routes from leaking.

Figure 6:
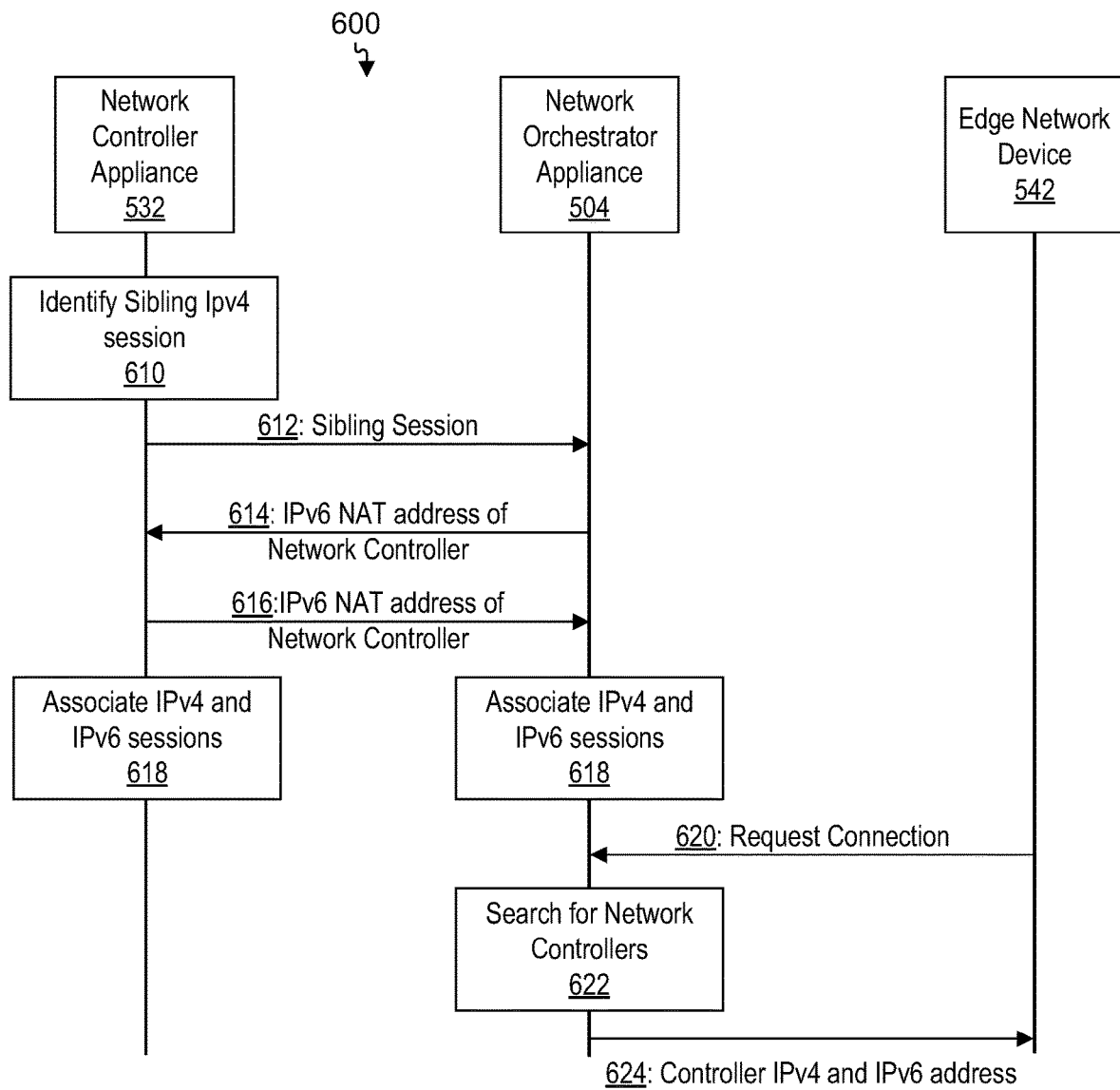
FIG. 6 illustrates an example sequence diagram to prevent IPv4 or IPv6 route leakage in accordance with an embodiment.

FIG. 6 illustrates an example sequence diagram 600 to prevent IPv4 or IPv6 route leakage using the network configuration illustrated in FIG. 5. As will be described below, different IP addresses of a network controller appliance 532 will be relayed over a single connection (e.g., IPv4 or IPv6) to prevent route leakage. The address information will be relayed from a network controller appliance 532 to a network orchestrator appliance 504, which will provide that information to an edge network device 542.

After a network controller appliance 532 has configured a first connection (e.g., an IPv4 connection) with a network orchestrator appliance 504, the network controller appliance 532 may request setup of an additional DTLS connection for a second address (e.g., an IPv6 address). During the DTLS challenge phase, the network controller appliance 532 may identify that a connection (e.g., the IPv4 connection) exists and identifies that the IPv4 connection is a sibling session at block 610. The network controller appliance 532 thereby determines to insert a sibling session field (e.g., a type length value (TLV)) into control messages that are transmitted to the network orchestrator appliance 504 at block 612.

The network orchestrator appliance 504 receives a control message, analyzes the control message, and identifies the sibling session field. The network orchestrator appliance 504 transmits an IPv6 address of the network controller appliance 532 as perceived by the network orchestrator appliance 504 to the network controller appliance 532 at block 614. Accordingly, the IPv6 address that is transmitted is the address that is perceived by the network orchestrator appliance 504 because the network controller appliance 532 is located behind a NAT.

The network controller appliance 532 identifies the corresponding IPv4 session and returns the IPv6 address of the network controller appliance 532 to the network orchestrator appliance 504 at block 616 using the IPv4 connection. At block 618, the network orchestrator appliance 504 and the network controller appliance 532 associate the IPv4 address and the IPv6 address of the network controller appliance 532. In some examples, the IPv6 address of the network controller appliance 532 can be associated in the network orchestrator appliance with a Boolean value that indicates that the IPv6 address is related to another IPv4 address, but does not have to explicitly identify which IPv4 address. As will be described below, this Boolean value will allow the network orchestrator appliance to understand that this IPv6 address is associated with another address and can be skipped. In other examples, the IPv6 address and the IPv4 address can be expressly linked via a pointer or some other data structure.

At block 620, an edge network device 542 may be activated and may request identification network controller appliances from the network orchestrator appliance 504. This may occur when an edge network device 542 is activated (e.g., booted, restarted, etc.), and requests identification of the network controller appliances to identify a network controller appliance to handle control communication via the Overlay Management Protocol (OMP).

At block 622, the network orchestrator appliance 504 searches for network controller appliances to identify to the edge network device 542. During the search, the network orchestrator appliance 504 only considers each network controller appliance a single time, even if the network controller appliance is a dual-stack device and includes both an IPv4 address and an IPv6 address. That is, the network orchestrator appliance 504 prevents double counting of the network controller appliances.

The network orchestrator appliance 504 sends a response identifying at least one network controller appliance. When the network controller appliance includes an IPv4 address and an IPv6 address, the response identifies both the IPv4 address and the IPv6 address at block 622. In this example, communication with the network controller appliance 532 is restricted in the IPv6 domain. Therefore, the network orchestrator appliance 504 transmits the message identifying both IPv4 and IPv6 addresses using an IPv4 connection at block 622.

Consequently, the edge network device 542 receives both the IPv4 address and the IPv6 address of the network controller appliance 532 and is able to configure a suitable network connection with the network controller appliance 532. That is, the edge network device 542 receives identification of IPv4 and IPv6 addresses and can select the appropriate connection with the network controller appliance. Accordingly, because the data center 505 is presumed to be located in the first region 510, the devices located in second region 515 would be able to connect to the network devices in the first region 510 for control plane and management plane functions. This configuration allows horizontal scaling of additional domains and geographical regions and prevents leaking of routes, while allowing the network edge devices 542 to configure the optimal connection to the network controller appliances 532.

While the examples described above in FIG. 5 and FIG. 6 are described to constrain messages to the IPv4 domain, the descriptions are equally applicable to IPv6 and constraining communications in the IPv4 domain. For example, the IPv4 addresses of the network controller appliances 532 can be transmitted to the network orchestrator appliances over the IPv6 connection to prevent IPv4 route leakage.

Figure 7:
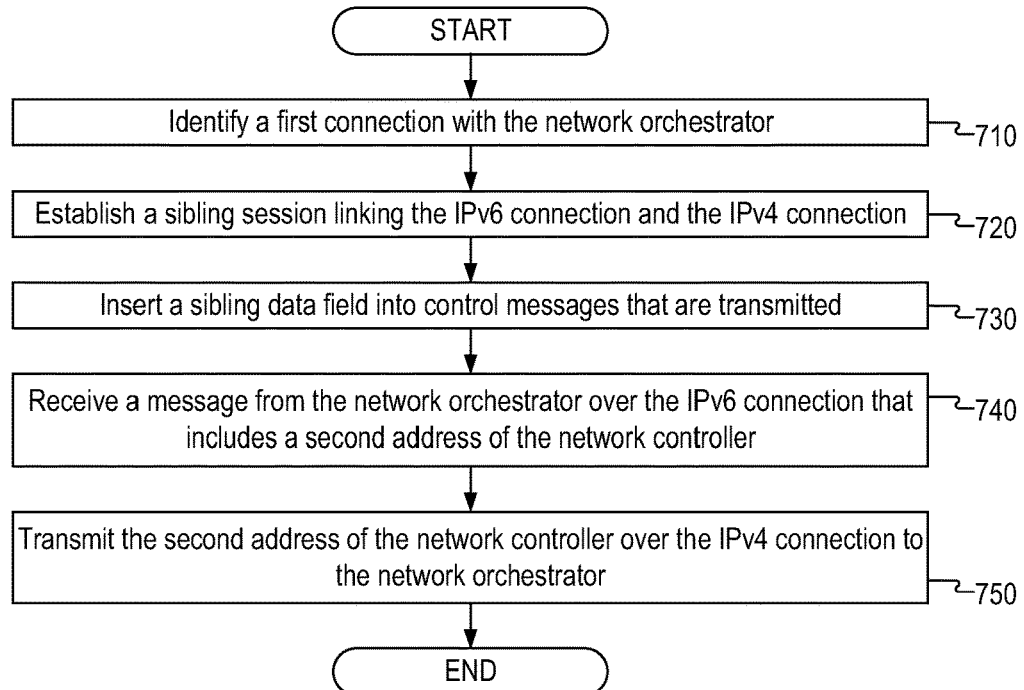
FIG. 7 is a flowchart of a method for a network controller appliance in accordance with an embodiment.

FIG. 7 illustrates an example method 700 for a network controller appliance. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes, when a second connection is requested with the network orchestrator, identifying a first connection with the network orchestrator at block 710. In some examples, the identification of the first connection occurs during a challenge phase of a DTLS session initialization between the network orchestrator and the network controller that are located in different regions. As an example, the processor 1100 illustrated in FIG. 11 may identify a first connection with the network orchestrator during establishment of a second connection with the network orchestrator from the network controller.

For purposes of explanation of this example, the first connection will be presumed to be an IPv4 connection for discussion and the second connection will be presumed to be an IPv6 connection. However, the first connection can be an IPv6 connection and the second connection can be an IPv4 connection.

Because the network orchestrator and the network controller are located in different regions, the network orchestrator and the network controller may be associated with different domains and a network address translator may be implemented to translate the IP addresses. In some examples, as described below with reference to FIG. 10F, the network controller can be connected to multiple network orchestrators.

According to some examples, the method 700 includes establishing a sibling session that links the IPv6 connection and the IPv4 connection at a control plane at block 720. By linking the sessions, this may preclude double counting of the network connection by the network controller and network orchestrator, which can prevent a device from finding an optimal network connection. To that end, the processor 1100 may use a universal unique identifier (UUID) of the network orchestrator to find and establish a sibling session that links the IPv6 connection and the IPv4 connection at a control plane.

According to some examples, the method 700 includes inserting a sibling data field that identifies the sibling session into control messages at block 730. For example, the processor 1100 may insert a sibling data message that identifies the sibling session into control messages. The network orchestrator receives the sibling data message and associates the IPv4 connection and the IPv6 connection as a single logical connection.

In response to the control message, the method 700 may receive a message from the network orchestrator over the IPv6 connection that includes an address of the network controller associated with the IPv6 connection at block 740. The received address is the address of the network controller that is perceived by the network orchestrator (i.e., the translated IP address). Notably, the network controller is unaware of its perceived public IP addresses and therefore must receive the address from an external source. Therefore, the processor 1100 may receive a message from the network orchestrator over the IPv6 connection that includes the address of the network controller associated with the IPv6 connection.

According to some examples, the method 700 includes transmitting the address of the network controller over a different connection to the network orchestrator at block 750. For example, the processor 1100 may transmit the IPv6 address of the network controller over the IPv4 connection to the network orchestrator. The network orchestrator receives the IPv6 address of the network controller and associates the IPv4 connection and the IPv6 connection as a single logical connection. The network orchestrator is configured to transmit the IPv4 address and the IPv6 address during setup of edge network devices using a single interface, and the edge network devices can select the ideal interface for the network connection. However, in some example, the network orchestrator informs a network edge device of the IPv6 address of the network controller using an IPv4 connection.

Accordingly, the method 700 allows the network orchestrator to provide both IPv4 and IPv6 addresses to the network edge devices using a single connection. In this example, informing the network edge device of the IPv6 address of the network controller over the IPv4 connection precludes leakage of routes associated with network address translation because communications with a network edge device will constrain communications with the network controller to a single interface.

Figure 8:
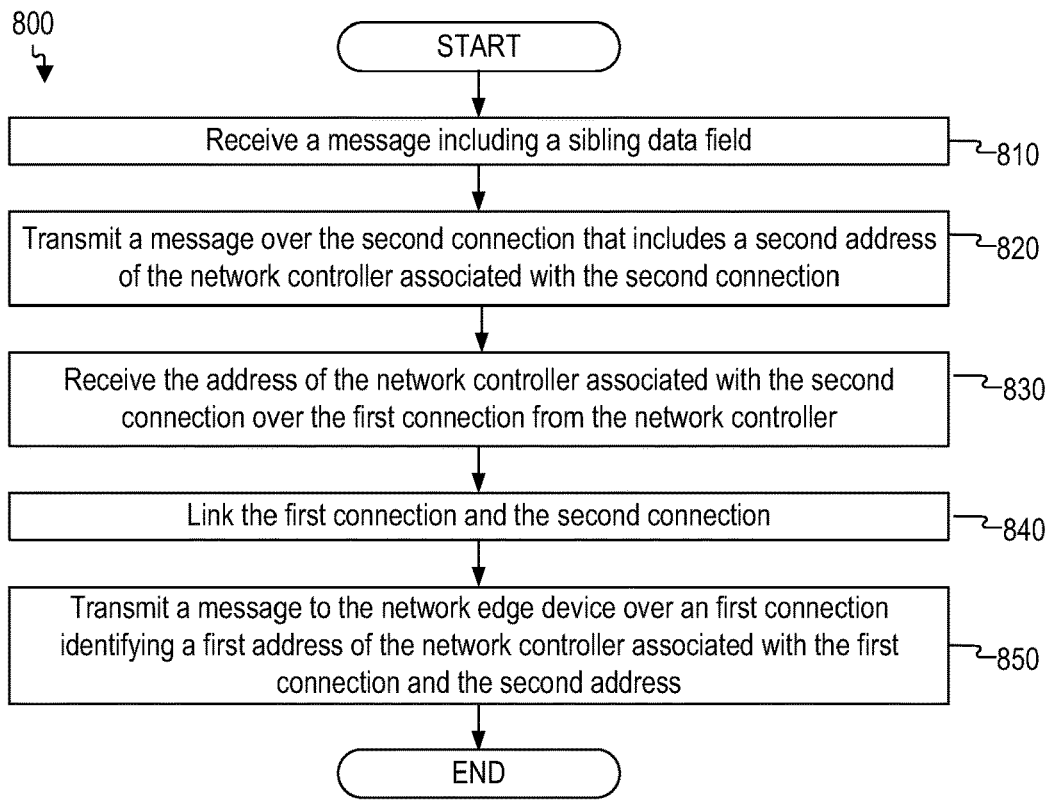
FIG. 8 is a flowchart of a method for a network orchestrator appliance in accordance with an embodiment.

FIG. 8 illustrates an example method 800 for a network orchestrator. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method 800 includes receiving a message including a sibling data field that indicates the first connection is related to the second connection at block 810. The sibling data field is a TLV that is inserted by the network controller and indicates that an existing connection with the network controller exists. For example, the processor 1100 illustrated in FIG. 11 may, while creating an IPv6 session, receive a message including a sibling data message that indicates an IPv4 connection is related to the IPv6 connection.

According to some examples, the method 800 includes transmitting a message to the network controller over the second connection at block 820. This message may include a second address of the network controller that is associated with the second connection. For example, presuming that an IPv4 session exists, the processor 1100 may transmit a message to the network controller over the IPv6 connection that includes an IPv6 address of the network controller that is perceived by the network orchestrator. As noted above, the network controller is unaware of its IPv6 address in different regions due to NAT and therefore the network orchestrator provides the IPv6 NAT address of the network controller to the network controller.

According to some examples, the method 800 includes receiving the address of the network controller associated with the second connection over the first connection from the network controller at block 830. For example, to cause the network orchestrator to link the IPv4 and IPv6 sessions, the processor 1100 may receive the IPv6 NAT address of the network controller over the IPv4 connection from the network controller.

According to some examples, the method 800 links the first connection and the second connection as a single logical connection at block 840. For example, the processor 1100 may link the IPv4 connection and the IPv6 connection as a single logical connection.

According to some examples, the network orchestrator may receive a request to connect a network edge device. Accordingly, the processor 1100 of the network orchestrator may search for network controllers to identify to the edge network device. Accordingly, the network orchestrator may analyze each edge network device based on the IPv4 address. However, the network orchestrator may analyze each network edge devices based on the IPv6 address when the IPv6 address and IPv4 address are not linked. That is, the network orchestrator analyzes each network controller a single time.

The method 800 may further include, in response to receiving the request to connect a network edge device, transmitting a message to the network edge device over a IPv4 connection at block 850. The message may identify a first address of the network controller associated with the first connection and the second address. For example, the processor 1100 may, in response to receiving a request to connect a network edge device, transmit a message to the network edge device over an IPv4 connection that identifies the IPv4 address and the IPv6 address of the network controller.

Figure 9:
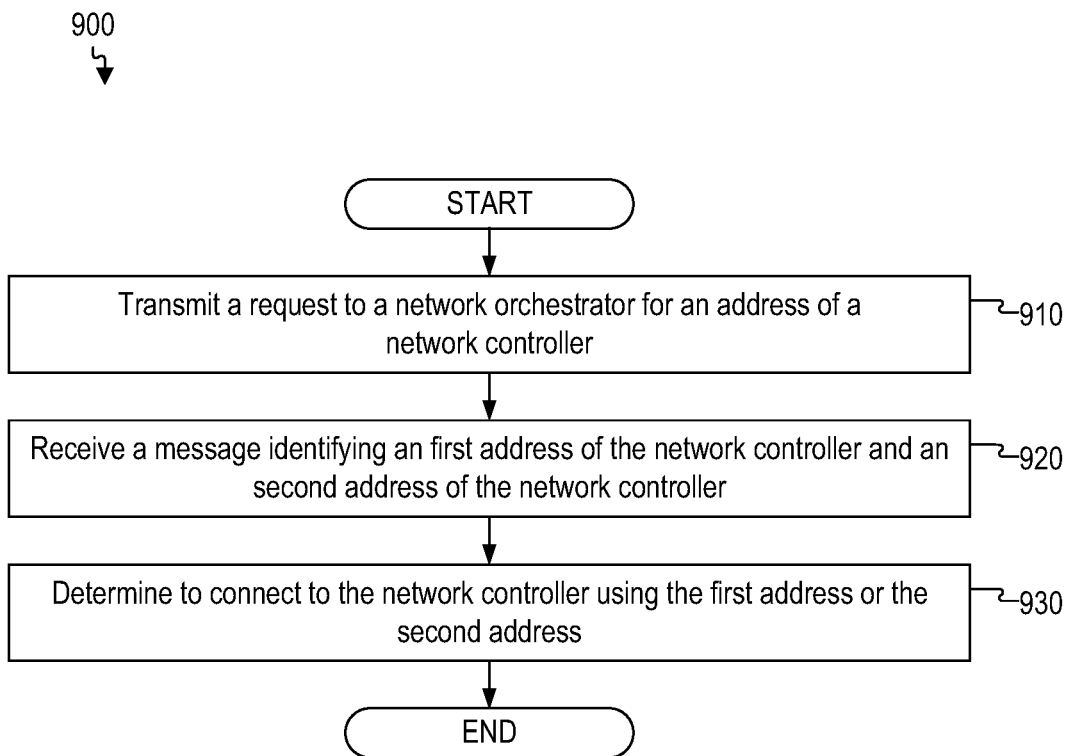
FIG. 9 is a flowchart of a method for a network edge device in accordance with an embodiment.

FIG. 9 illustrates an example method 900 of a network edge device for connecting to a network controller. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method 900 includes transmitting a request to a network orchestrator for an address of a network controller to manage the network edge device over a first connection at block 910. For example, the processor 1100 may transmit a request to a network orchestrator for an address of a network controller to manage the network edge device over an IPv4 connection.

According to some examples, the method 900 includes receiving a message identifying a first address of the network controller and an second network address of the network controller at block 920. For example, the processor 1100 may receive a message identifying an IPv4 address of the network controller and an IPv6 network address of the network controller.

According to some examples, the method 900 includes determining to connect to a network controller via the first address or the second address at block 930. For example, the processor 1100 may determine to connect to the network controller via an IPv4 address or an IPv6 address.

Figure 10D:
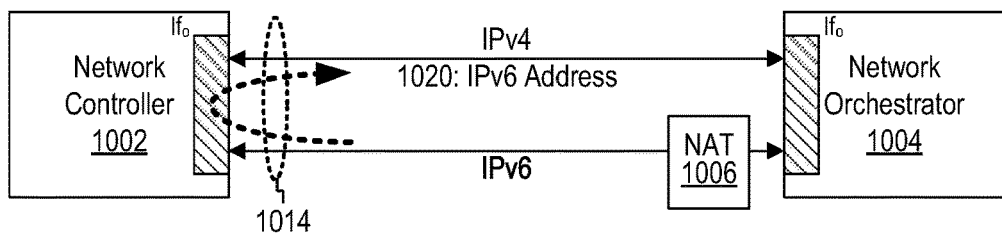

FIG. 10A, FIG. 10B, FIG. 10C, FIG. 10D, FIG. 10E, and FIG. 10F are block diagrams illustrating communications of the network in different regions or domains. In particular, FIG. 10A illustrates a network controller 1002 and a network orchestrator 1004 are in communication over an IPv4 connection and a IPv6 connection. Although not shown, the network controller 1002 and network orchestrator 1004 are located in different geographical regions and associated with different domains. The IPv6 connection is translated using a NAT 1006 to prevent route leakage. The network controller 1002 and the network orchestrator 1004 exchange UUIDs over the IPv4 connection at step 1010 and UUIDs over the IPv6 connection at step 1012.

FIG. 10B illustrates that a sibling session 1014 is formed that causes the IPv4 and IPv6 connections to be treated as a single logical connection.

FIG. 10C illustrates that that the network orchestrator transmits the IPv6 address of the network controller 1002, as perceived by the network orchestrator 1004 at interface If$_0$, is transmitted to the network controller 1002 at step 1016.

FIG. 10D illustrates that the IPv6 address of the network controller 1002, as perceived by the network orchestrator 1004, is transmitted to the network orchestrator 1004 over the IPv4 connection at step 1020. Once received by the network orchestrator 1004, the network orchestrator 1004 associates the IPv4 and IPv6 addresses and treats the IPv4 and IPv6 connections as a single logical connection.

Figure 10E:
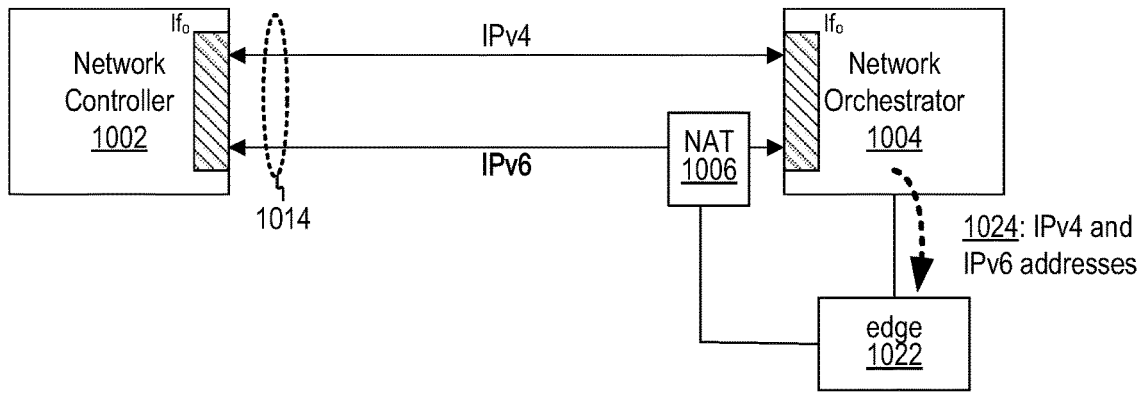

FIG. 10E illustrates that an edge device 1022 requests a network controller from the network orchestrator 1004. At step 1024, the network orchestrator sends the IPv4 and IPv6 addresses of the network controller 1002 over an IPv4 connection to the edge device. The edge device 1022 may communicate with the network controller 1002 using an IPv4 connection or using an IPv6 connection with the NAT 1006.

Figure 10F:
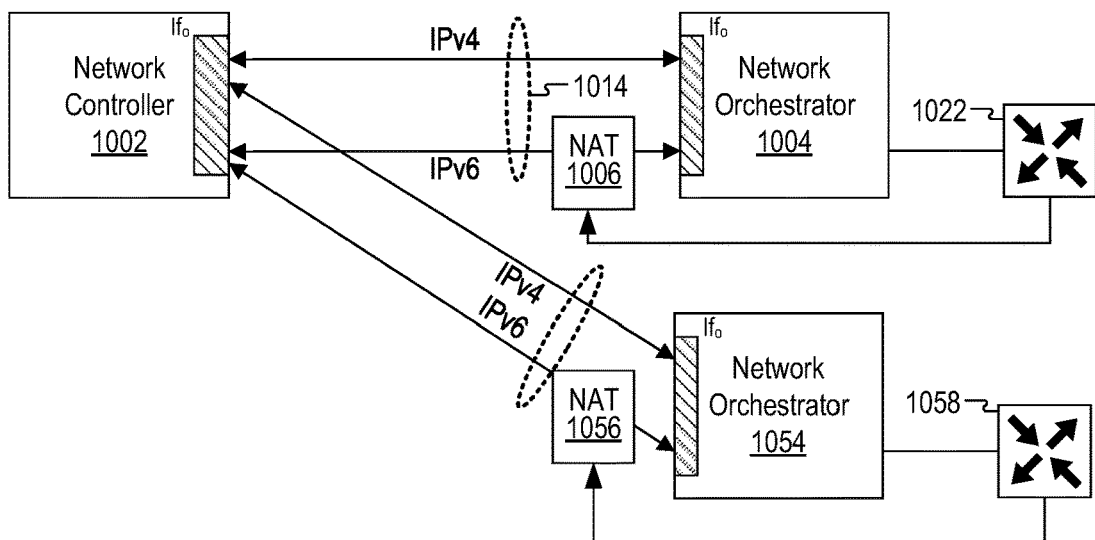

FIG. 10F illustrates that a second network orchestrator 1054, a second NAT 1056, and a second edge device 1058 can be implemented in a different region or different domain to horizontally scale the network while centralizing network management functions. That is, the network controller 1002 can be implemented to control both edge device 1020 and edge device 1058, even though both are in different domains.

Figure 11:
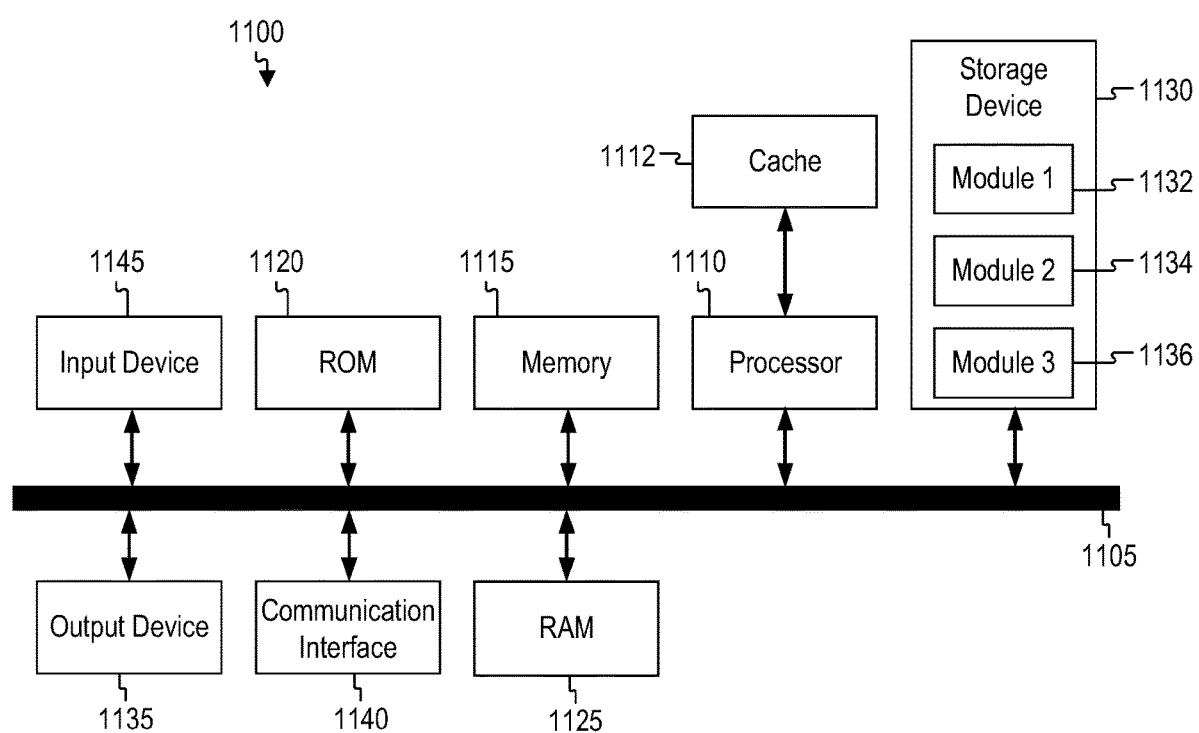
FIG. 11 shows an example of computing system 1100, which can be for example any computing device that can implement components of the system according to an example of the instant disclosure.

FIG. 11 shows an example of computing system 1100, which can be for example any computing device making up network orchestrator appliance 504, network controller appliance 532, edge network device 542, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments computing system 1100 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140 (e.g., a transceiver), which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method, comprising: identifying a first connection with a network orchestrator during establishment of a second connection with the network orchestrator from a network controller; establishing a sibling session that links the second connection and the first connection at a control plane; inserting a sibling data message that identifies the sibling session into control messages sent; receiving a message from the network orchestrator over the second connection, the message including an address of the network controller associated with the second connection; and transmitting the second address of the network controller over the first connection to the network orchestrator, wherein the network orchestrator receives the second address of the network controller and associates the first connection and the second connection as a single logical connection, wherein the network orchestrator is configured to transmit the first address and the second address during setup of network edge devices.

Aspect 2. The method of Aspect 1, wherein the sibling session is identified based on identifying a UUID of the network orchestrator.

Aspect 3. The method of any of Aspects 1 to 2, wherein the network orchestrator receives the sibling data message and associates the first connection and the second connection as a single logical connection.

Aspect 4. The method of any of Aspects 1 to 3, wherein identification of the first connection occurs during a process challenge phase of a DTLS session initialization.

Aspect 5. The method of any of Aspects 1 to 4, wherein the network orchestrator informs a network edge device of the second address of the network controller using a first connection.

Aspect 6. The method of any of Aspects 1 to 5, wherein informing the network edge device of the second address of the network controller over the first connection precludes leakage of routes associated with network address translation.

Aspect 7. The method of any of Aspects 1 to 6, wherein the network controller is located in a first region and the network orchestrator is located in a second region that is different from the first region.

Aspect 8. The method of any of Aspects 1 to 7, wherein a network address translator converts IP addresses associated with the second region into IP addresses associated with the first region.

Aspect 9. The method of any of Aspects 1 to 8, wherein the network controller is connected with a second network orchestrator is a different region.

Aspect 10. The method of any of Aspects 1 to 9, wherein the first connection is an IPv4 connection and the second connection is an IPv6 connection, or wherein the first connection is an IPv6 connection and the second connection is an IPv4 connection.

Aspect 11. A method, comprising: receiving a message including a sibling data message that indicates a first connection is related to a second connection, wherein the message is received when the first connection and the second connection are established with a network controller; transmitting a message to the network controller over the second connection, the message including a second address of the network controller associated with the second connection; receiving the address of the network controller associated with the second connection over the first connection from the network controller; linking the first connection and the second connection as a single logical connection; in response to receiving a request to connect a network edge device, transmitting a message to the network edge device over a first connection, the message identifying a first address of the network controller associated with the first connection and the second address.

Aspect 12. The method of Aspect 11, further comprising: analyzing each connection of each network controller managed by a network orchestrator that is associated with a first type of address and analyzing each connection of each network controller that is associated with a second type of address and that is not linked to a connection associated with the first type of address.

Aspect 13. A network controller comprising: a transceiver; a processor configured to execute instructions and cause the processor to: identify a first connection with a network orchestrator during establishment of a second connection with the network orchestrator from the network controller, establish a sibling session that links the second connection and the first connection at a control plane, insert a sibling data message that identifies the sibling session into control messages, receive a message from the network orchestrator over the second connection, the message including an address of the network controller associated with the second connection, transmit the second address of the network controller over the first connection to the network orchestrator, wherein the network orchestrator receives the second address of the network controller and associates the first connection and the second connection as a single logical connection, and the network orchestrator is configured to transmit the first address and the second address during setup of network edge devices.

Aspect 14. The network controller of Aspect 13, the sibling session is identified based on identifying a UUID of the network orchestrator.

Aspect 15. The network controller of any of Aspects 13 to 14, the network orchestrator receives the sibling data message and associates the first connection and the second connection as a single logical connection.

Aspect 16. The network controller of any of Aspects 13 to 15, identification of the first connection occurs during a process challenge phase of a DTLS session initialization.

Aspect 17. The network controller of any of Aspects 13 to 16, the network orchestrator informs a network edge device of the second address of the network controller using a first connection.

Aspect 18. The network controller of any of Aspects 13 to 17, informing the network edge device of the second address of the network controller over the first connection precludes leakage of routes associated with network address translation.

Aspect 19. The network controller of any of Aspects 13 to 18, the network controller is located in a first region and the network orchestrator is located in a second region that is different from the first region.

Aspect 20. The network controller of any of Aspects 13 to 19, a network address translator converts IP addresses associated with the second region into IP addresses associated with the first region.

Aspect 21: A network device includes a transceiver (e.g., a network interface, a wireless transceiver, etc.) and a processor coupled to the transceiver. The processor configured to execute instructions and cause the processor to: identify a first connection with a network orchestrator during establishment of a second connection with the network orchestrator from a network controller; establish a sibling session that links the second connection and the first connection at a control plane; insert a sibling data message that identifies the sibling session into control messages sent; receive a message from the network orchestrator over the second connection, the message including an address of the network controller associated with the second connection; and transmit the second address of the network controller over the first connection to the network orchestrator, wherein the network orchestrator receives the second address of the network controller and associates the first connection and the second connection as a single logical connection, wherein the network orchestrator is configured to transmit the first address and the second address during setup of network edge devices.

Aspect 22: The network device of Aspect 21, wherein the sibling session is identified based on identifying a UUID of the network orchestrator.

Aspect 23: The network device of any of Aspects 21 to 22, wherein the network orchestrator receives the sibling data message and associates the first connection and the second connection as a single logical connection.

Aspect 24: The network device of any of Aspects 21 to 23, wherein identification of the first connection occurs during a process challenge phase of a DTLS session initialization.

Aspect 25: The network device of any of Aspects 21 to 24, wherein the network orchestrator informs a network edge device of the second address of the network controller using a first connection.

Aspect 26: The network device of any of Aspects 21 to 25, wherein informing the network edge device of the second address of the network controller over the first connection precludes leakage of routes associated with network address translation.

Aspect 27: The network device of any of Aspects 21 to 26, wherein the network controller is located in a first region and the network orchestrator is located in a second region that is different from the first region.

Aspect 28: The network device of any of Aspects 21 to 27, wherein a network address translator converts IP addresses associated with the second region into IP addresses associated with the first region.

Aspect 29: The network device of any of Aspects 21 to 28, wherein the network controller is connected with a second network orchestrator is a different region.

Aspect 30: The network device of any of Aspects 21 to 29, wherein the first connection is an IPv4 connection and the second connection is an IPv6 connection, or wherein the first connection is an IPv6 connection and the second connection is an IPv4 connection.

Aspect 31: A network device includes a transceiver (e.g., a network interface, a wireless transceiver, etc.) and a processor coupled to the transceiver. The processor configured to execute instructions and cause the processor to: receive a message including a sibling data message that indicates a first connection is related to a second connection, wherein the message is received when the first connection and the second connection are established with a network controller; transmit a message to the network controller over the second connection, the message including a second address of the network controller associated with the second connection; receive the address of the network controller associated with the second connection over the first connection from the network controller; link the first connection and the second connection as a single logical connection; in response to receiving a request to connect a network edge device, transmit a message to the network edge device over a first connection, the message identifying a first address of the network controller associated with the first connection and the second address.

Aspect 32: The network device of Aspect 31, wherein the processor is configured to execute the instructions and cause the processor to: analyze each connection of each network controller managed by a network orchestrator that is associated with a first type of address and analyzing each connection of each network controller that is associated with a second type of address and that is not linked to a connection associated with the first type of address.

Aspect 33: A network device includes a transceiver (e.g., a network interface, a wireless transceiver, etc.) and a processor coupled to the transceiver. The processor configured to execute instructions and cause the processor to: a transceiver; a processor configured to execute instructions and cause the processor to: identify a first connection with a network orchestrator during establishment of a second connection with the network orchestrator from the network controller, establish a sibling session that links the second connection and the first connection at a control plane, insert a sibling data message that identifies the sibling session into control messages, receive a message from the network orchestrator over the second connection, the message including an address of the network controller associated with the second connection, transmit the second address of the network controller over the first connection to the network orchestrator, wherein the network orchestrator receives the second address of the network controller and associates the first connection and the second connection as a single logical connection, and the network orchestrator is configured to transmit the first address and the second address during setup of network edge devices.

Aspect 34: The network device of Aspect 33, wherein the sibling session is identified based on identifying a UUID of the network orchestrator.

Aspect 35: The network device of any of Aspects 33 to 34, wherein the sibling session is identified based on identifying a UUID of the network orchestrator.

Aspect 36: The network device of any of Aspects 33 to 35, wherein identification of the first connection occurs during a process challenge phase of a DTLS session initialization.

Aspect 37: The network device of any of Aspects 33 to 36, wherein the network orchestrator informs a network edge device of the second address of the network controller using a first connection.

Aspect 38: The network device of any of Aspects 33 to 37, wherein the processor is configured to execute the instructions and cause the processor to: inform the network edge device of the second address of the network controller over the first connection precludes leakage of routes associated with network address translation.

Aspect 39: The network device of any of Aspects 33 to 38, wherein the network controller is located in a first region and the network orchestrator is located in a second region that is different from the first region.

Aspect 40: The network device of any of Aspects 33 to 39, wherein a network address translator converts IP addresses associated with the second region into IP addresses associated with the first region.

What is claimed is:

1. A method, comprising:
receiving a message including a sibling data message that indicates a first connection is related to a second connection, wherein the message is received when the first connection and the second connection are established with a network controller;
transmitting a message to the network controller over the second connection, the message including a second address of the network controller;
receiving the second address of the network controller associated with the second connection over the first connection from the network controller;
associating the first connection and the second connection; and
in response to receiving a request to connect a network edge device, transmitting a message to the network edge device over a single connection, the message identifying a first address of the network controller associated with the first connection and the second address.

2. The method of claim 1, further comprising:
analyzing each connection of each network controller managed by a network orchestrator that is associated with a first type of address and analyzing each connection of each network controller that is associated with a second type of address and that is not associated with the first type of address.

3. The method of claim 1, wherein the sibling data message includes type length value which indicates an existing IPv4 connection with the network controller.

4. The method of claim 1, wherein the associating the first connection and the second connection comprises linking the first connection and the second connection into a single logical connection.

5. The method of claim 1, wherein the first connection is an IPv4 connection and the second connection is an IPv6 connection.

6. The method of claim 5, wherein the transmitting the message to the network edge device comprises transmitting the message over an IPv6 connection that identifies an IPv4 address and an IPv6 address of the network controller.

7. The method of claim 1, wherein the first connection is an IPv6 connection and the second connection is an IPv4 connection.

8. A system, comprising:
a non-transitory computer readable memory;
a processor programmed to cooperate with instructions stored in the memory to perform operations comprising:
receive a message including a sibling data message that indicates a first connection is related to a second connection, wherein the message is received when the first connection and the second connection are established with a network controller;
transmit a message to the network controller over the second connection, the message including a second address of the network controller;
receive the second address of the network controller associated with the second connection over the first connection from the network controller;
associate the first connection and the second connection; and
in response to receiving a request to connect a network edge device, transmit a message to the network edge device over a single connection, the message identifying a first address of the network controller associated with the first connection and the second address.

9. The system of claim 8, the operations further comprising:
analyzing each connection of each network controller managed by a network orchestrator that is associated with a first type of address and analyzing each connection of each network controller that is associated with a second type of address and that is not associated with the first type of address.

10. The system of claim 8, wherein the sibling data message includes type length value which indicates an existing IPv4 connection with the network controller.

11. The system of claim 8, wherein the associating the first connection and the second connection comprises linking the first connection and the second connection into a single logical connection.

12. The system of claim 8, wherein the first connection is an IPv4 connection and the second connection is an IPv6 connection.

13. The system of claim 12, wherein the transmitting a message to the network edge device comprises transmitting a message over an IPv6 connection that identifies an IPv4 address and an IPv6 address of the network controller.

14. The system of claim 8, wherein the first connection is an IPv6 connection and the second connection is an IPv4 connection.

15. A non-transitory computer readable memory storing instructions programmed to cooperate with a processor of a computer system to cause the computer system to perform operations comprising:
receive a message including a sibling data message that indicates a first connection is related to a second connection, wherein the message is received when the first connection and the second connection are established with a network controller;
transmit a message to the network controller over the second connection, the message including a second address of the network controller;
receive the second address of the network controller associated with the second connection over the first connection from the network controller;
associate the first connection and the second connection; and in response to receiving a request to connect a network edge device, transmit a message to the network edge device over a single connection, the message identifying a first address of the network controller associated with the first connection and the second address.

16. The non-transitory computer readable memory of claim 15, the operations further comprising:
analyzing each connection of each network controller managed by a network orchestrator that is associated with a first type of address and analyzing each connection of each network controller that is associated with a second type of address and that is not associated with the first type of address.

17. The non-transitory computer readable memory of claim 15, wherein the sibling data message includes type length value which indicates an existing IPv4 connection with the network controller.

18. The non-transitory computer readable memory of claim 15, wherein the associating the first connection and the second connection comprises linking the first connection and the second connection into a single logical connection.

19. The non-transitory computer readable memory of claim 15, wherein the first connection is an IPv4 connection and the second connection is an IPv6 connection.

20. The non-transitory computer readable memory of claim 19, wherein the transmitting a message to the network edge device comprises transmitting a message over an IPv6 connection that identifies an IPv4 address and an IPv6 address of the network controller.

* * * * *